United States Patent [19]

Kelleher

[11] Patent Number: 4,507,591
[45] Date of Patent: Mar. 26, 1985

[54] LINEAR PULSE WIDTH TO CURRENT CONVERTER FOR BRUSHLESS DC MOTORS

[75] Inventor: Kevin C. Kelleher, Plainfield, Ind.

[73] Assignee: RCA Corporation, New York, N.Y.

[21] Appl. No.: 517,390

[22] Filed: Jul. 26, 1983

[51] Int. Cl.³ ............................................. H02P 6/02
[52] U.S. Cl. .................................. 318/254; 318/138; 318/318; 318/439
[58] Field of Search ................ 318/138, 254 A, 254, 318/439, 154, 318

[56] References Cited

U.S. PATENT DOCUMENTS

| | | | |
|---|---|---|---|
| 4,096,419 | 6/1978 | Wren et al. | 318/254 A X |
| 4,158,795 | 6/1979 | Tarumi et al. | 318/254 X |
| 4,356,437 | 10/1982 | Saito et al. | 318/254 |
| 4,358,720 | 11/1982 | Abe | 318/138 X |
| 4,418,303 | 11/1983 | Abe et al. | 318/254 |

FOREIGN PATENT DOCUMENTS

| | | | |
|---|---|---|---|
| 19395 | 2/1981 | Japan | 318/254 |
| 80293 | 5/1982 | Japan | 318/254 |
| 22574 | 2/1983 | Japan | 318/254 |

Primary Examiner—Stanley J. Witkowski
Assistant Examiner—Bentsu Ro
Attorney, Agent, or Firm—E. M. Whitacre; P. J. Rasmussen; R. G. Coalter

[57] ABSTRACT

A system for controlling the speed of a brushless DC motor includes a microprocessor for generating stator control drive signals responsive to Hall sensors detecting relative rotor-pole-stator positions. Hall sensor signal transitions are compared against a reference frequency to provide an error signal which is processed by the microprocessor. Stator commutation control signals are provided dependent upon the Hall sensor signal transitions. A control signal along with the commutation control signals are thereafter applied to integrating current drivers which provide substantially rectangular current pulses to the stator coils.

4 Claims, 6 Drawing Figures

4,507,591

LINEAR PULSE WIDTH TO CURRENT CONVERTER FOR BRUSHLESS DC MOTORS

This invention relates to servo systems and in particular to a digitally controlled servo loop for maintaining constant speed in a brushless DC motor.

BACKGROUND OF THE INVENTION

DC motors are manufactured which have a rotor element including permanent magnets having a plurality of successively spaced north and south poles. The permanent magnet is disposed proximate a fixed stator element having a plurality of windings or coils for producing magnetic fields when current is conducted therein. By selectively energizing the coils, magnetic fields are generated which impart forces on the magnetic fields emanating from the poles of the rotor magnet to produce rotation of the rotor. Commonly, Hall effect sensors are located in fixed relation to the coils and disposed proximate the rotor magnet to sense the relative position of the poles on the rotor magnet. Signals from the Hall sensors are employed to phase the energization of the coils to produce efficient operation of the motor.

It is known to control the speed of such motors by comparing the rate of revolution thereof to a known frequency such as from a stable oscillator and adaptively adjusting the motor drive parameters to eliminate the frequency error therebetween. Typically, the output of such control or servo systems are applied to adjust either the bias potential of the commutating Hall sensors or the supplied potential to the coil driver.

One such system is described in U.S. patent application Ser. No. 405,441 filed on Aug. 5, 1982, in the name of K. C. Kelleher et al. In this system a simplified servo system uses a microprocessor to perform phase comparison and servo loop filtering, Hall effect sensors to provide commutation signals and rotor rotation, and coil drivers for energizing the coils. Speed is controlled by varying the duration of the stator coil drive pulses. The initiation of the stator coil drive pulses is delayed from the normal commutation point (i.e., the Hall sensor transition) proportional to the speed error signal and the termination of the drive pulses is determined by the Hall sensor transitions. The error signal is processed digitally in the microprocessor, via software, to produce a second order servo function so that there are no accumulated errors.

In accordance with this prior art microprocessor-based system the coil current source is an integrator which produces a triangular current pulse which effects a torque in the motor proportional to the square of the input pulse width. Using a triangular current pulse to drive the motor can cause some problems in the system. Since the power to the motor is related to the area under the current pulse curve and the power delivered to the motor is based on the Hall sensor output the pulse width delivered to the motor must be the square root of the error signal calculated from the Hall sensor output. Thus to determine the pulse width necessary to maintain the desired speed the microprocessor must be capable of performing a square root function. The square root operation in a 4-bit microprocessor is a comlex operation requiring substantial memory and, therefore, a DC motor system of the Kelleher et al. type must use a more expensive microprocessor. Furthermore, the triangular current pulse causes some problems because some AC ripple is introduced into the system. This AC ripple can generate motor and timebase errors which could introduce acoustical noise in a turntable used for audio playback, e.g., an audio turntable or a video disc player.

SUMMARY OF THE INVENTION

In accordance with the present invention a microprocessor-based DC motor uses an integrator which can be put into a "hold" condition so that, with proper control signals, a torque is produced which is proportional to the input pulse in a nearly linear manner.

In accordance with one aspect of the present invention a system is provided for controlling a brushless DC motor of the type having two or more stator coils which are successively energized to impart rotation to a rotor. The rotor includes a permanent magnet having a plurality of alternating north and south poles. The system comprises first and second sensor elements mounted in fixed relation to the stator coils for providing first and second bilevel signals representing the relative position of the rotor magnet poles with respect to the stator coils. A reference signal having a frequency to which the rotation rate of the rotor is to be synchronized is used. A control signal generating means (e.g., microprocessor) is responsive to the first and second bilevel signals for generating pulsed control signals the phases of which are determined by the state of the first and second bilevel signals. Responsive to the pulsed control signals are driver circuits which are used for energizing respective ones of the stator coils. The driver circuits provide stator coil driver current of either polarity. When the control signal generating means provides pulsed control signals to the driver circuits such that the stator coil driver current is generally triangular in shape during a locked speed mode the torque generated in the system contains undesirable ripple which causes noise. According to the present invention the ripple is eliminated. Further, when the control signal generating means provides an error signal related to the difference between the rotation rate of the rotor and the frequency of the reference signal for generating the pulsed control signal during the locked speed mode the square root of the error signal is taken. In such a system the control signal generating means controls the phase and duration of the pulsed control signal in accordance with the square root of the error signal thus, requiring a controlled signal generating means capable of taking the square root of the error signal. According to the present invention, the control signal generating means generates a speed control signal for providing stator coil driver current which is linearly related to the pulse width of the speed control signal during the locked speed mode. Thus, the control signal generating means does not have to be capable of taking the square root of the error signal.

DETAILED DESCRIPTION OF THE INVENTION

The invention will be described in the environment of a disc record player for producing signals from, for example, video disc records. The DC motor to be controlled is of the brushless type and is employed to rotate the player turntable. The motor stator coils are in fixed relation to the base of the player. The motor rotor includes a permanent magnet having a plurality of successive alternating north and south poles radially disposed about a concentric shaft and in a fixed relation thereto. Two Hall sensors are mounted in fixed relation to the base and located proximate the rotor for sensing the relative position of the rotor poles with respect to the stator coils.

Figure 1:
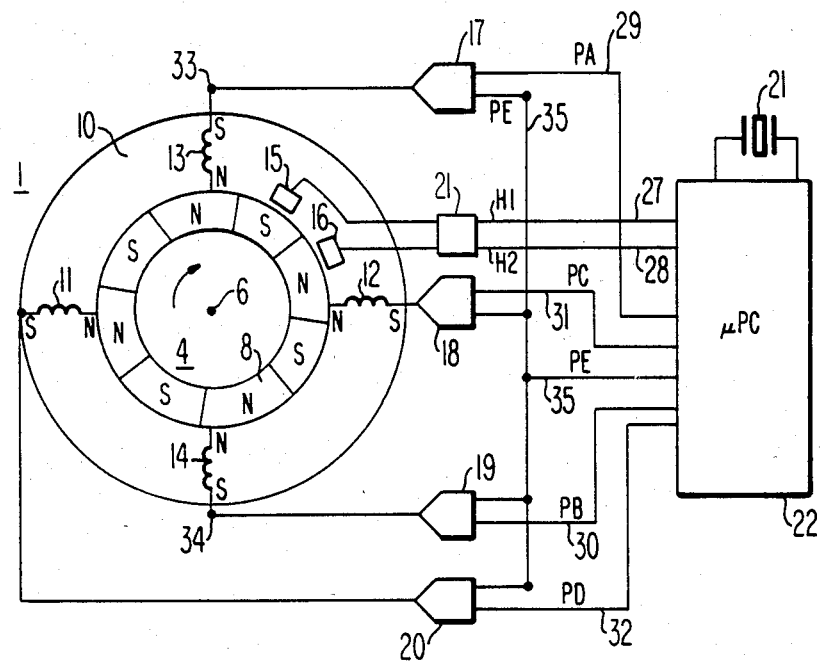
FIG. 1 is a partial block, partial schematic diagram of a brushless DC motor system embodying the principles of the present invention.

Referring to FIG. 1, stator 10 of brushless DC motor 1 has first and second serially connected stator coils 13 and 14 (not shown as being connected in FIG. 1) which are spatially disposed 180° relative to the axis of rotation. Third and fourth serially connected stator coils 11 and 12 are respectively spatially disposed 90° from coils 13 and 14 with respect to the rotor axis. Stator coils 13 and 14 are positioned to be in like relationship, physically, to like rotor poles of rotor magnet 8 on opposite sides of the rotor axis 6 (north and south poles of the rotor magnet are interleaved). Similarly, the windings of the coils are arranged to produce like electromagnetic fields with respect to the rotor poles on opposite sides of axis 6 for a given energizing current. Stator coils 11 and 12 are disposed to be in like relationship to like rotor poles of rotor magnet 8 on opposite sides of rotor axis 6.

A first current driver 17 responsive to control signals PA on connection or conductor 29 and on conductor 35 is connected to the serially connected coils 13 and 14 at connection 33 for providing coil current of a first polarity thereto. A second current driver 19 responsive to control signals PB on conductor 30 and PE on conductor 35 provides coil current of opposite polarity via connection 34 to the serially connected coils 13 and 14. Similarly, current drivers 18 and 20 responsive to control signals PC and PD on conductors 31 and 32, respectively, and PE on conductor 35 provides mutually oppositely-directed current through serially connected stator coils 11 and 12. Current drivers 17, 18, 19 and 20 are phased with respect to one another for generating electromagnetic fields in the stator coils which interact with the magnetic fields produced by rotor magnet 8 to impart rotation to rotor 4 as is known in the art of brushless DC motors.

In a preferred embodiment, current drivers 17 and 19 are subsumed in a signal bridge-type driver which will be described hereinafter with respect to FIG. 3. Similarly, current drivers 18 and 20 are subsumed in a second bridge-type current driver.

In accordance with the prior art Kelleher system the control signals PA, PB, PC and PD are rectangular pulses and current drivers 17–20 integrate these pulses. For relatively long control pulses, e.g., 90 electrical degrees, the integrating drivers rapidly saturate to produce an output to the coils which is substantially a rectangular pulse. On the other hand, for short control pulses the drivers output triangular drive signals, the amplitude of which is proportional to the control pulse width. In accordance with the FIG. 1 diagram the integrating drivers provide substantially rectangular drive pulses to the coils for either relatively long or short control pulses. Thus, the torque of the motor is related linearly to the pulse width.

Referring again to FIG. 1, two Hall sensors 15 and 16 are arranged in fixed relation to the stator to provide control signals for commutating the drive pulses to the coils to provide clockwise rotation of the rotor. The Halls sensors are angularly positioned to provide signals which are electrically in, e.g., 90° electrical phase relationship. In the present discussion it will be presumed that the Hall sensors include zero crossing and waveform shaping circuit 21 enabling them to provide square wave (bilevel) signals having logic level amplitude.

Figure 2:
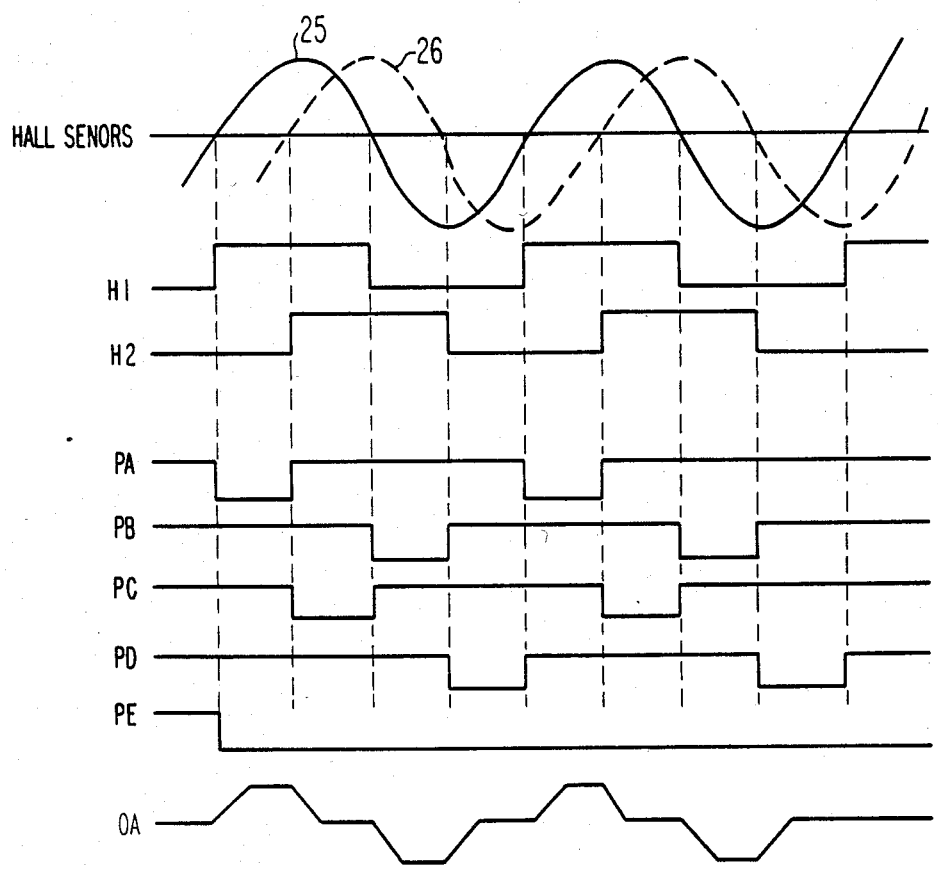
FIG. 2 is a timing diagram showing driving waveforms at various points of the FIG. 1 system when the DC motor is in the start up mode of operation.

Signals H1 and H2 from waveform shaping circuit 21 are applied to microprocessor 22. Responsive to signals H1 and H2 the microprocessor 22 generates four phase (commutating) signals PA, PB, PC and PD providing one input to coil drivers 17–20. Further, microprocessor 22 provides pulse signal PE which is used for controlling the integration time of drivers 17–20. The cycle time of microprocessor 22 is sufficiently fast that there is no substantial delay between the transition of the Hall sensor signal and the transition of the control signals PA-PE except when delay is intentionally included. In the video disc player application, microprocessor 22 is clocked at a 3.579545 MHz frequency available from the video signal processing circuitry within the player, shown as oscillator 21. FIG. 2 shows the time relationships of the Hall sensor signals, the control pulses PA-PE and the current drive signal in coils 13 and 14 when the system is operating in a spin-up or start mode. During spin-up the stator coils are energized to produce maximum torque which entails driving the stator coils 13 and 14 for 90 (electrical) degrees with a first polarity current, then driving stator coils 11 and 12 for 90° with the first polarity current. Coils 13 and 14 are then driven for 90° with opposite polarity current after which coils 11 and 12 are driven for 90° with opposite polarity current.

In FIG. 2 the substantially sinusoidal waveform 25 is a signal generated by Hall sensor 15. Similarly, Hall sensor 16 generates a substantially sinusoidal potential 26 which is delayed 90° with respect to Hall sensor 25 signal. The signals 25 and 26 are sensed for zero crossings to provide respective square wave logic signals H1 and H2 which are available on connections 27 and 28 of FIG. 1. Signals H1 and H2 are repeatedly examined by the microprocessor which, responsive to transitions thereof, generates the signals PA-PD. Furthermore, the microprocessor provides signal PE which is used to saturate the integrator during spin-up operation. For each of the H1 signal periods the PA-PD control signals have quarter cycle periods defined by the transitions of the H1 and H2 signals. Each quarter cycle period corresponds to 90 electrical degrees. Responsive to the PA-PE control signals the current drivers output substantially quarter cycle current pulses coincident with the respective control pulse. The drive current waveform OA (shown only for one pair of coils) is shown wherein the leading and trailing edges of the current pulses are ramped due to the integrating characteristic of drivers 17 and 19.

It will be readily appreciated that as the rotor increases angular speed the periods of the signals H1 and H2 decrease and the periods of the control pulses PA-PD are correspondingly reduced.

Figure 3:
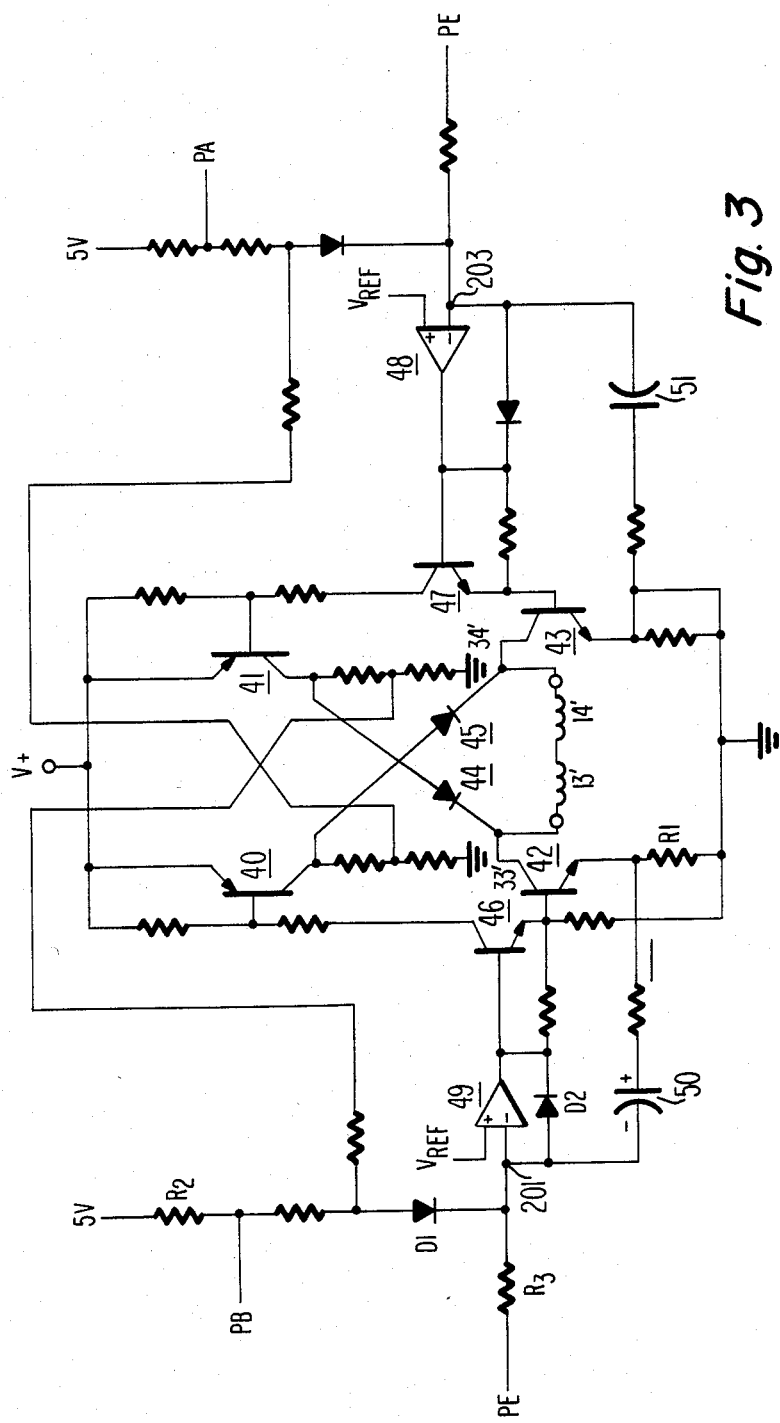
FIG. 3 is a circuit schematic of a stator coil current driver in accordance with the present invention.

FIG. 3 illustrates a bridge-type current driver for driving a pair of stator coils 13' and 14'. In the FIGURES, elements designated with like reference numerals are the same or similar items in the various FIGURES. In the circuit PNP transistor 40 having emitter and collector electrodes respectively connected to positive supply potential V+ and (by way of a diode 45) to connection 34' and NPN transistor 42 having collector and emitter electrodes respectively connected between connection 33' and relatively negative supply potential (ground) via a resistor are simultaneously conditioned into conduction by amplifier transistor 46. The amplitude of current conducted by transistor 42 is proportional to the potential applied to the base electrode of transistor 46. When transistors 40 and 42 are conditioned to conduct (by transistor 46) conventional current flows from right to left (in the FIGURE) in the stator coils 13' and 14'. Similarly PNP transistor 41 connected between positive supply V+ and connection 33' and NPN transistor 43 connected between connection 34' and the negative supply potential (ground) via a resistor are conditioned for simultaneous conduction by amplifier transistor 47. Diodes 45 and 44 are serially connected in the collector circuits of transistors 40 and 41, respectively, to isolate the PNP transistor which is not conducting from potential spikes which may be created by the coil inductance.

Transistor amplifiers 46 and 47 are conditioned to conduct by differential amplifiers 49 and 48, respectively. Differential amplifier 49 is responsive to the control signals PB and PE applied to its inverting input via connection 201. Differential amplifier 48 is responsive to control signals PA and PE applied to its inverting input terminal via connection 203. The reference voltage $V_{REF}$ is connected to the non-inverting inputs of amplifiers 48 and 49 for controlling their operation. Since the PA and PB control signals are not in a low state at the same time transistors 40, 42 and transistors 41, 43 conduct to the exclusion of each other.

Amplifier 49 (48), transistors 46 and 42 (47 and 43) comprise a composite amplifier with capacitive degenerative feedback 50 (51). This arrangment is in the form of a classic integrator circuit to provide the integration characteristics mentioned previously. Control signals PA-PD are effectively voltages from relatively low-impedance sources including resistor R2. Control voltage waveform PE appears at the inverting input terminal of amplifier 49 as a result of a controlled switch coupled to ground at the remote end of resistor R3 via an open-drain output stage from microprocessor 22. The operation of the bridge-type current driver will be explained with reference to FIG. 3 and the waveforms PA-PE and OA of FIG. 4. Control signals PA-PD are the commutating signals which are responsive to the transitions of Hall sensors 15 and 16. Control signal PE is variable in the locked speed mode to control the current through the stator coils and thus the speed of the motor. When control signals PB and PE go from a high state to a low state the output voltage of amplifier 49 ramps-up toward the positive rail voltage, thereby turning on transistor 46 which in turn turns on transistors 40 and 42. The current through transistor 42 charges capacitor 50 through source PE during the ramping action. The current continues to flow through capacitor 50 charging it while the control signal PE remains in the ground state. When control signal PE returns to a high state, capacitor 50 holds its voltage value since there is no circuit path for the capacitor to discharge through so long as the PB pulse remains low and diode D1 remains reverse-biased. When PB goes to the high state, diode D1 becomes forward-biased and capacitor 50 then discharges through PB, D1 and R1 so that the voltage across resistor R1 and thus the current through stator coils 13' and 14' ramp-down. Waveform OA shows this ramp down action. The discharge current follows the path through R2, D1 and R1 to ground. As the duration of the pulse PE is extended, as shown by the phantom lines of the PE waveform, the current through stator coils 13' and 14' continues to ramp-up higher (lower) as shown by the phantom lines of waveform OA. When control signal PE goes to a high state the charging of capacitor 50 ceases and the driver holds the current at its last value. Diode D2 having its anode connected to the invertng input of amplifier 49 protects amplifier 49 when the voltage level of signal PB is high.

Figure 5:
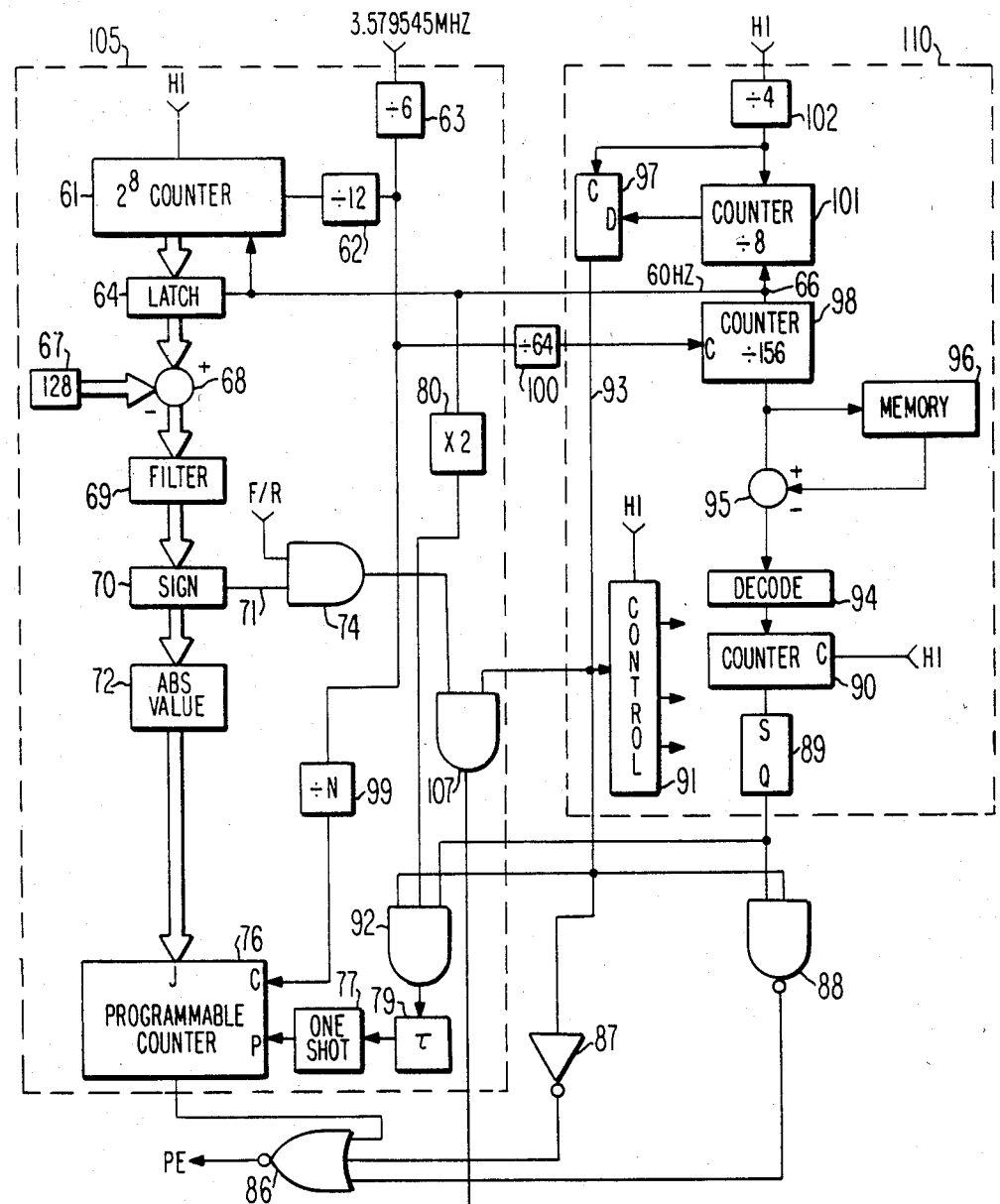
FIG. 5 is a block diagram of circuitry for realizing the functions provided by the FIG. 1 microprocessor.
Figure 5:
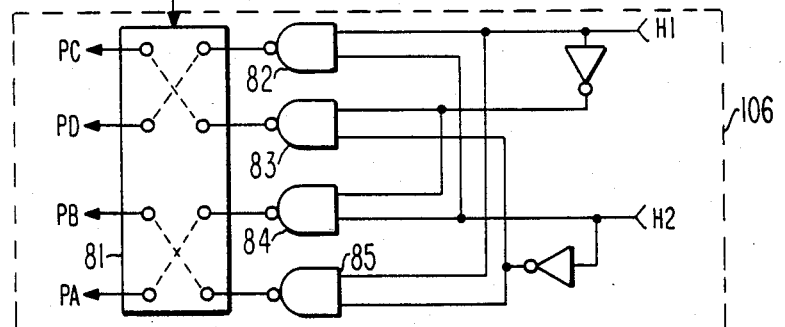

FIG. 5 is a block diagram of the microprocessor circuitry of the present invention, the description of which will serve to generally explain the functional operation of the microprocessor 22 of FIG. 1. Control of the DC motor is performed in three modes: spin-up, locked speed, and spin-down. The spin-up mode was generally described previously. With reference to FIG. 2 the four control signals PA-PD are representative of the four logic states of the two Hall sensor signals H1 and H2. In FIG. 5, the four control signals PA-PD are generated by the circuitry circumscribed by the broken line 106 including the four 2-input NAND gates 82-85. The inputs of the NAND gates receive the requisite combinations of the Hall signals H1 and H2 and their complements $\overline{H1}$ and $\overline{H2}$ to selectively produce the states of the control signals illustrated in FIG. 2 in the spin-up mode. The output signals from NAND gates 82 and 83 and NAND gates 84 and 85 are applied to cross-switches 81 which effectively control the direction of current applied to the stator coils. The state of the cross-point switches is controlled by the output state of AND gate 107 which state is held at a logic "low" during spin-up so that the relative phase of the control signals PA-PD remains constant.

During spin-up, the system successively checks the output signal from Hall sensor 15 to determine if the rotor is approaching locked speed. In a video disc player locked speed is substantially 450 rpm or 7.5 Hz. The rotor magnet is designed with four sets of north and south poles. Thus for every four cycles of the Hall sensor control signal H1, at locked speed, there are eight cycles of 60 Hz signal. For rotor speeds less/more than the locked speeds there are more/less than eight cycles of 60 Hz signal. The system successively counts the number of cycles of 60 Hz signal per four periods of Hall sensor signal. When eight cycles of 60 Hz pulses per revolution are detected the difference from their being exactly eight cycles of 60 Hz signal during the last revolution is measured. The PE signal which controls the current through the stator coils is delivered via NOR gate 86. The difference value is utilized to reduce the pulse duration of control signal PE to tend to prevent the rotor rotation rate from overshooting the locked rate. In this way the system anticipates when locked speed will occur and reduces rotor acceleration for the Hall sensor cycle at which the rotor will attain locked speed.

In FIG. 5, the circuitry circumscribed by box 110 monitors spin-up speed. In the circuit, dividers 63 and 100 (elements 63 and 100 are shown outside of box 110) and counter 98 divide down the 3.58 MHz system clock to produce pulses occurring at substantially 60 Hz. The 60 Hz pulses, present on connection 66, clock counter 101. Counter 101 is arranged to output a pulse having a duration of a 60 Hz period (16.6 mSec) for every eight clocking pulses. The output signal from counter 101 is applied to the input terminal of latch 97.

Hall sensor signal H1 is divided in the divider circuit 102 to generate an output pulse for every four Hall sensor cycles, which is equivalent to one output pulse per revolution of the rotor. The output pulses from divider 102 are applied to reset counter 101 and to latch the output of counter 101 into circuit 97. If eight clock pulses of the 60 Hz signal have occurred during one rotor revolution, output connection 93 of latch 97 will be in a "high" state. If more or less than eight 60 Hz clock pulses occur, the latch 97 output will be in a logically "low" state. During spin-up the logical "low" output state on conductor 93 is inverted by inverter 87 and applied to NOR gate 86. In response thereto NOR gate 86 outputs a logical "low" as previously assumed in the description of the operation of circuitry 106. On the other hand, when the output of latch 97 is "high", NOR gate 86 is controlled by NAND gate 88 or programmable counter 76.

Figure 6:
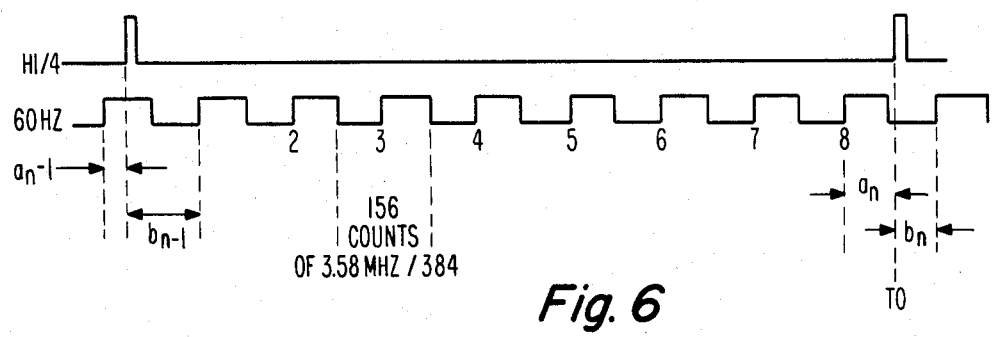
FIG. 6 is a timing diagram of driving waveforms provided by the FIG. 1 and FIG. 5 circuits when the system is operating phase locked to a stable reference frequency.

The circuitry anticipates when the rotor will attain locked speed by successively determining how much greater the duration of the one rotor rotation is than the duration of exactly eight cycles of the 60 Hz clock. Assume that counter 98 is an eight-bit binary counter with logic arranged to reset the count to 0 on the 156th input pulse. In the FIG. 5 circuit, this reset pulse provides the system 60 Hz clock signal. Nominally when counter 101 counts the 60 Hz clock signals, the transition of the 60 Hz signals will not coincide with the reset output of counter 102 which corresponds to the transition of Hall sensor signal H1 divided by 4. Assume that counter 101 triggers or counts responsive to the positive transitions of the 60 Hz signal. The waveforms of FIG. 6 illustrate a typical relationship between the 60 Hz signal and the H1/4 signal as the rotor approaches locked speed. The numbers adjacent the positive transition of the 60 Hz signal indicate the point at which counter 101 is incremented. It can be seen that there are seven complete cycles of 60 Hz signal plus the quantity $b_{n-1} + a_n$ between successive pulses of the H1/4 signal, i.e., per one revolution of the rotor. Each cycle of the 60 Hz signal represents a count of 156 by counter 98. At time $t_0$ counter 98 will contain a count or binary number corresponding to $a_n$. The remaining count to complete a 60 Hz period is therefor $156 - a_n$ or $b_n$. From simple arithmetic it can be shown that the value by which $b_{n-1} + a_n$ differs from 156 is equal to $a_n - a_{n-1}$. Thus by substracting successive values of the number resident in counter 98 at the instance of the occurrence of the H1/4 reset signals, the time at which the rotor will achieve locked speed can be predicted. For a given system, statistically it can be determined that once the number $a_n - a_{n-1}$ enters a particular range the rotor will attain locked speed during the next revolution and the value of the number $a_n - a_{n-1}$ is generally indicative of one of the four Hall sensor cycles during which lock will occur.

Referring again to FIG. 5, the count resident in counter 98 is accessed and stored in memory 96. The count $a_n$ is also applied to adder 95 where it is differentially added to the previous count $a_{n-1}$ available from memory element 96 to produce the difference $a_n - a_{n-1}$. This number is applied to decoder 94. When the value of $a_n - a_{n-1}$ is within the requisite range indicative of the approach of locked speed during the next rotor revolution the decoder produces an output to program the counter 90. Counter 90 counts cycles of the Hall sensor signal H1 and generates an output for the H1 cycle at which locked speed is anticipated and sets flip-flop 89 which places the system in the locked speed mode. (The memory 96, adder 95, decoder 94 and counter 90 are all synchronized by controller 91 which is responsive to the H1 signal and the reference frequency.)

Note that during the time that latch 97 goes high and the system achieves the locked-speed mode, NAND gate 88 having first and second input terminals connected to the output terminals of latches 97 and 89, and having an output terminal connected to a further input terminal of NOR gate 86, maintains the output potential of NOR gate 86 low until the locked-speed mode is activated.

The circuitry circumscribed by block 105 performs the locked-speed servo function. Operation of this circuitry will be described with reference to the waveforms of FIG. 4. The circuit elements are generally described in a manner representative of the operation of microprocessor 22 of FIG. 1 in the locked-speed mode.

Figure 4:
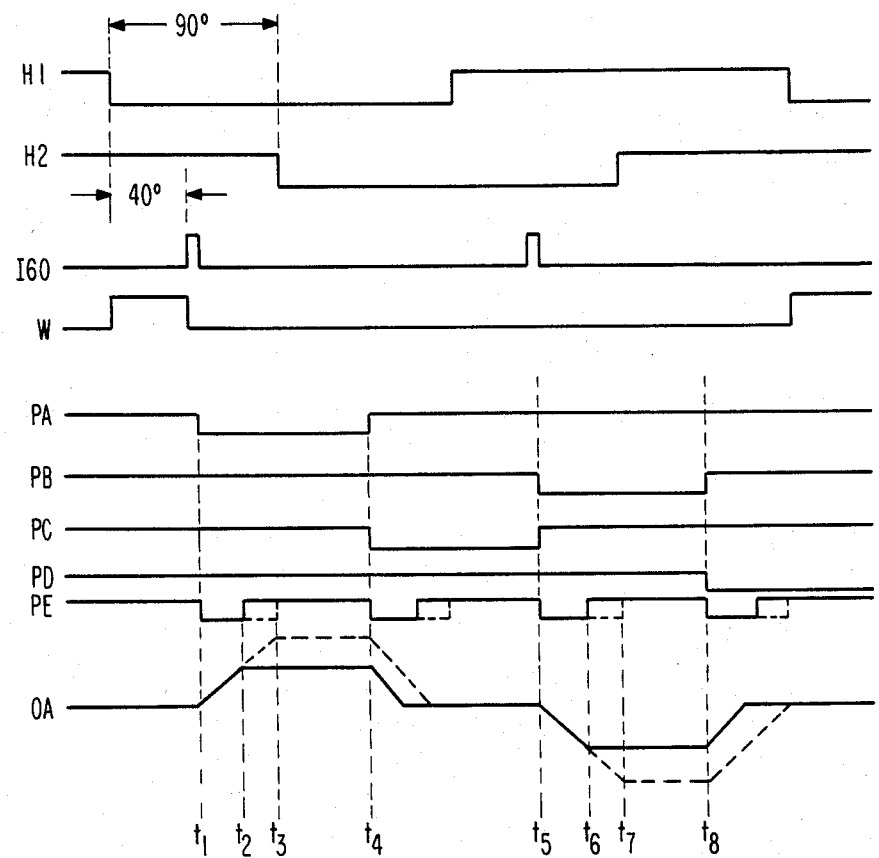
FIG. 4 is a timing diagram relating to the locked speed operation of the system.

In the locked-speed mode the phase relationship of the Hall sensor signal H1 is determined with reference to the leading edge of the 60 Hz reference signal pulses four times per revolution, i.e., during each cycle of the Hall sensor signal. This is done by starting counter 61, which counts 3.58/72 MHz signals, at the negative transition of the H1 signal and halting the counter at the leading edge of the 60 Hz pulse from counter 98. The number in counter 61 is indicative of the phase error. Referring to FIG. 4, the H1 signal is shown along with the I60 signal which is the output from counter 98 showing the 60 Hz pulses. Waveform W indicates the count period of counter 61. The width of the positive going pulse W is the phase detection period and has a maximum width of 256 cycles of a 49 KHz clock (e.g., 3.58/72 MHz). A count of 256 represents a phase difference of 40 electrical degrees. When the H1 signal is phase locked with the reference frequency the number in counter 61 is 128. Thus to determine if the H1 signal is advanced or retarded from the locked condition the number 128 which is stored in memory 67 is used to compare to the number resident in counter 61. The number in counter 61 is latched (64) at the positive transition of the 60 Hz signal. This count is subtracted in subtractor 68 from the number resident in memory 67. A positive difference indicates that the H1 phase is advanced relative to the desired phase relationship while a negative difference indicates that it is delayed. The error signal output from subtractor 68 is filtered in filter 69 to insure closed loop system stability. A suitable filter function for the present invention is described in the aforementioned Kelleher et al. application.

The system performs two's complement arithmetic and, therefore, equal positive and negative differences will be represented by different binary numbers. The sign of the error signal is determined by the sign function 70 and the absolute value of the error signal is determined in the absolute value block 72. Advancing or retarding rotor phase is accomplished by determining the amplitude of the drive current to be applied to the stator coils (via programmable counter 76) to control signal PE and the phasing is performed under the control of the "sign" bit via AND gate 74 and AND gate 107 which controls switch 81. Thus, equal increments or decrements in rotor speed will be effected by equal drive signals. The two's complement negative differences are, therefore, converted to positive numbers to be further processed in the same channel as positive differences.

For smooth operation of the DC motor in the locked-speed mode it is advantageous to drive the stator coils with a pulse that has a ramped leading edge and a ramped trailing edge rather than strictly rectangular pulses. Drive control is performed by controlling the amplitude of the current pulse through the stator coils.

In the prior art Kelleher et al. microprocessor controlled system the drive signals were triangular in shape for short pulse durations and drive control was performed by controlling the width of the control pulses PA-PD which were integrated by the coil drivers. Because the integration function affects the amplitude of the drive signals, the driving energy applied to the stator coil was proportional to the square of the change in the control pulse width. In order to account for the squaring factor a square root function had to be performed on the error signal in microprocessor 22. The square root of the error signal was employed to control the width of the control pulses PA-PD. These triangular drive pulses require a microprocessor capable of performing a square root function and effected AC ripple which created noise in the motor system. In accordance with the present invention the PE pulse is used to control the amplitude of the drive currents and the drive currents are substantially rectangular with the ramp-up and ramp-down leading and trailing edges. Thus the torque in the motor is linearly related to the pulse width PE and it is not necessary to take the square root of the error signal. Further, since the drive pulses are commutated for a generally 360° rotation of the motor the operation of the motor is much smoother.

In FIG. 5 the error signal from the absolute value box 72 is directed to the programming input terminal J of a programmable counter 76. Counter 76 produces an output dependent upon the input from the absolute value block 72. The counter output signal is applied via NOR gate 86 to enable control pulse PE to control the ramp-up time of the coil current to the stator coils. Counter 76 outputs a signal four times per H1 cycle. Programmable counter 76 is a digital-to-pulse width converter for providing a pulse of predetermined width for maintaining locked-speed. The larger the difference signal at the J input of programmable counter 76 the wider control pulse PE becomes. The phantom lines in the PE waveform shown in FIG. 4 indicate a region of variability in the control pulse, which region is located at the PE trailing edge. It should be noted that even for the unfiltered error signal of zero the system must provide drive pulses to overcome the frictional drag of the mechanical system. As a result the system may produce drive pulses when the motor speed is precisely correct. It follows that the drive pulses will tend to be phased to alternately advance and retard the motor speed.

The clock rate counted by counter 76 is determined by the resolution desired in the system. The higher the rate the more accurate or the more fine the resolution.

In FIG. 5 the clock rate is 3.58 MHz divided by 6 in counter 63 and N in counter 99. Note that the programming count is loaded into counter 76 by the 60 Hz reference signal (actually 2 times 60 Hz) 80 via one shot 77 connected to the "P" input of counter 76. Since the 60 Hz signal initiates the process of calculating the phase error it is necessary to build in a delay via delay 79 in the "P" input signal to allow the error calculation to be completed. The calculations, however, occur sufficiently fast that the delay does not significantly affect the control pulse width of the PE signal or may be accounted for by including a constant in the error signal. Note further that the output of counter 76 has no effect on the pulse generating NOR gate 86 during spin-up since the output of the NOR gate 86 is constantly held low by virtue of the signal from latch 97.

Spin-down or stopping the motor is accomplished by switching the system back to the spin-up phase with the PA, PB, PC and PD phases reversed. With reference to FIG. 5 this is tantamount to simply switching the cross-point switches 81 via AND gate 107. The rotor will fall out of synchronism with the reference frequency, latch 97 will go low and drive pulses will be produced in circuit 106 solely responsive to the Hall sensor signal H1 and H2. When the rotor comes to rest the system must be deenergized to preclude it from accelerating in the reverse direction.

In the microprocessor implementation the motor is stopped by (a) reversing the phase of the PA-PD signals via software and (b) generating pulse waveforms responsive to the detection of transitions in the the H1, H2 signals. The drive pulse PE is substantially constant during the duration of deceleration to insure maximum deceleration. The microprocessor determines when the rotor reverses rotation by monitoring the successive transitions of the waveform H1 and H2. A positive transitions of the H1 signal when the H2 signal is high or a negative transition of H2 when H1 is high indicates a phase reversal in the rotor magnet and thereby a motor rotation reversal. At this point all drive current to the stator coils can be ceased.

What is claimed is:

1. A system for controlling a brushless DC motor of a type having two or more stator coils which are successively energized to impart rotation to a rotor including a permanent magnet having a plurality of interleaved north and south poles comprising:

first and second sensor elements providing first and second bilevel signals corresponding to the relative position of said poles of said rotor magnet with respect to said stator coils;

a reference signal having a frequency to which the rotation rate of said rotor is to be synchronized;

control signal generating means responsive to said first and second bilevel signals for generating commutating signals the phases of which are determined by the state of said first and second bilevel signals and the durations of which are substantially determined by successive transitions of said bilevel signals, and being further responsive to said reference signal for synchronizing motor speed in a locked speed mode, said control signal generating means generating a speed control signal related to the difference between said rotation rate of said rotor and said reference signal frequency;

driving circuits, responsive to said commutating signals and said speed control signal, for energizing respective ones of said stator coils with drive currents, said driving circuits including an integrator for controlling the amplitude of the drive current during said locked speed mode such that simultaneous delivery of one of said commutating signals and said speed control signal to one of said integrators causes said respective drive current to ramp-up, removal of said speed control signal causes said respective drive current to hold the value to which said respective drive current reached prior to said removal and removal of said one of said commutating signals causes said drive current to ramp-down.

2. The system according to claim 1 wherein said control signal generating means provides a continuous speed control signal to said driver circuits during a spin-up mode.

3. The system according to claim 2 wherein said control signal generating means is a microprocessor.

4. A stator current driver for a brushless direct-current motor comprising:
- a differential voltage-to-current converting means having a high-impedance inverting and a noninverting input terminal;
- current-sensing means coupled to an output terminal of said differential voltage-to-current converting means for generating a sense voltage representative of the output current of said differential voltage-to-current converting means;
- capacitance means coupled to said inverting input terminal of said differential current-to-voltage converting means and to said current sensing means for forming a negative feedback path;
- a reference voltage generator coupled to said noninverting input terminal of said differential voltage-to-current converting means;
- a first pulse source means for providing first control pulses having a voltage more negative than said reference voltage during those intervals during which increasing a constant output current is desired, and more positive at other times;
- unidirectional conducting means coupled to said first pulse source means and to said inverting input terminal for causing said unidirectional current conducting means to conduct during those intervals in which said first control pulses are more positive thereby causing said output current of said voltage-to-current converting means to ramp towards zero current, and for causing said unidirectional current conducting means to become nonconductive during those intervals in which said first control pulses are more negative thereby depriving said first pulse source means of control of said output current;
- a second pulse source means for providing second control pulses occurring during those said intervals in which increasing output current is desired, and being open-circuited at other times;
- coupling means for coupling said second pulse source means to said inverting input terminal for pulling said inverting input terminal more negative than said reference voltage during those said intervals in which increasing current is desired, thereby causing said output current to increase, and for preventing substantial current flow in said capacitance means during those said intervals in which a constant output current is desired whereby said output current remains constant, and whereby when said first control pulses go positive said unidirectional means conducts and said output current decreases towards zero; and
- a stator winding coupled to said output terminal of said voltage-to-current converting means for receiving said output current in accordance with said first and second control pulses.

* * * * *